Patented June 16, 1953

2,642,348

UNITED STATES PATENT OFFICE 2,642,348

BUFFING COMPOSITION FOR METALS AND METHOD OF MAKING SAME

Hugh A. Stier, Fairfield, Conn., assignor to E. E. Seeley Company, Incorporated, Bridgeport, Conn., a corporation of Connecticut No Drawing. Application March 19, 1951, Serial No. 216,453

5 Claims. (Cl. 51—295)

This invention relates to compositions of the so-called "lime type" for use in buffing metals in order to polish the same and has for its particular objects the provision of a composition of that character that is unusually stable when exposed to atmospheric conditions and consequently is capable of retaining its shape and ability to polish metals for many weeks without disintegration, due to deterioration thereof, even if unwrapped or if exposed in opened or leaky containers or otherwise to atmospheric influence.

The buffing compositions most commonly in use at the present time are composed of an intimate mixture of so-called Vienna lime, hereinafter defined, and a grease binder, the same being prepared by heating a mixture of about equal parts of a fatty acid and a glyceride in a steam-jacketed kettle, at about 200° F., and then slowly kneading into the resultant mass several parts of Vienna lime of about 325 mesh. When the materials are thoroughly blended, the mixture is placed in containers and allowed to cool, whereupon the containers are capped or sealed to exclude moisture and air. However, even with such precautions being taken the resultant buffing composition will slake and disintegrate within but about two or three days, if the humidity is high, say at least 50%, and the container is left uncapped during the use thereof. Moreover, if the container is leaky or improperly capped, a slow or delayed slaking may occur that often results in the bursting of the container in which it is confined. Furthermore, if after the aforesaid composition is stripped for use by removing the wrapper thereon, it is not promptly used but is allowed to lie around exposed to the atmosphere, then rapid and complete slaking occurs and the material becomes useless.

My investigations have led to the discovery of a novel buffing composition which is free from the foregoing defects or disadvantages when exposed to atmospheric influences, the same being so remarkably stable that even if the container in which it may be confined springs a leak or is improperly capped or even if the wrapping on a buffing block formed from such a composition is omitted or removed so that such block is exposed to the atmosphere, such composition will remain in a usable condition for a month or six weeks in sharp contra-distinction to the aforesaid "lime type" buffing composition in common use which will invariably become slaked within the course of but about two or three days if so exposed.

In the production of my novel buffing composition, it is preferable to proceed as follows:

28 parts of mixed tri-glycerides, desirably comprising a mixture composed of about 65 parts of stearin, 27 parts of palmitin and 3 parts of myristin, are introduced into a jacketed mill or mixer wherein it is heated to about 180° F., and until melted. Thereupon, 108 parts of powdered calcined Vienna lime, desirably of about 325 mesh, are slowly added to the melted glycerides and then the mixture is thoroughly agitated, for say 30 minutes, after which it is placed in molds and immediately chilled. It is essential that an aging period, desirably some twenty-four hours, be allowed to elapse after the completion of the chilling stage and before the wrapping and packing of or otherwise excluding air from the molded forms, in order to admit of sufficient moisture attacking the buffing composition obtained from the chilled mold so as to insure the formation of a dense, water-insoluble skin coat or protective envelope of an insoluble calcium soap of the particular fatty acids employed, such envelope being not less than about one sixty-fourth of an inch and desirably at least one thirty-second of an inch in thickness. After the expiration of the aging period, the molded block is desirably packed in hermetically sealed containers though it may be shipped in bulk without packaging the same, if desired.

Such skin coat or envelope of insoluble calcium soap serves, it is believed, to exclude the further admission of moisture, with the consequence that continued slaking of the mass either ceases or is materially retarded. It is difficult to account for such cessation of the slaking or film-formation on any other theory than that the great preponderance of the insoluble soap over the free fatty acids present in the insoluble surface layer of the buffing composition limits the amount of the composition that is exposed to reaction with atmospheric moisture.

The mixture of the tri-glycerides employed in making the buffing composition has the following characteristics, viz., titre 58–60° C., iodine value max. 5, free fatty acid max. oleic 5%, acid value max. 10, saponification value 190–195.

The Vienna lime which is referred to herein is described on pages 96–97 of part 1 of the Technical Bulletins on "Abrasives," published by the Canadian Dept. of Mines (1927) as follows:

"Vienna lime is a calcined, unhydrated, magnesium limestone or dolomite, and is composed of the oxides of calcium and magnesium. The dolomite used is a greyish white, fine-grained rock which occasionally displays certain characteristic fossils and is composed of about 55 per cent carbonate of calcium and about 43 per cent carbonate of magnesium, with traces of iron, silica, and alumina. For buffing purposes the lime and magnesia content should, approximately, be in the above proportions, as otherwise poor results are obtained. There are, however, many dolomites of this composition that would not be suitable since the fossil content of the rock appears to impart certain necessary physical properties."

The crux of the invention resides, not in the use of a mixture of tri-glycerides with Vienna lime for producing a buffing composition but in the employment of a mixture of Vienna lime and tri-glycerides which is potentially capable, after being chilled as aforesaid, of reacting with atmospheric moisture and progressively forming in situ on the molded block of buffing composition a water-insoluble protective skin coat or sealing envelope which effectively preserves the enveloped portion of the composition against deleterious slaking action by atmospheric moisture for many weeks, all as above explained, thus materially prolonging the polishing capacity of the buffing composition.

In lieu of the aforesaid mixture of tri-glycerides, I may employ a mixture of about equal parts of the tri-glycerides known as palmitin, stearin and olein such as exist in tallow, or other mixtures of tri-glycerides, such for example as fish glycerides. However, the amount of free fatty acids present in the glycerides employed should range between 3% and 10% of such tri-glycerides and desirably should be about 5% as, if the amount of free fatty acids is excessive and substantially exceeds about 10%, the aforesaid slaking reaction tends to progressively extend throughout the entire mass of the buffing composition within the course of but a few days, as above set forth.

The exact proportions of the Vienna lime and mixed glycerides hereinbefore specified may be varied but in no event should the Vienna lime be less than about 65% nor more than 85% nor should the amount of mixed glycerides be less than 15% nor more than 35%, by weight, of the buffing composition.

Various modifications of the method and ingredients as well as the proportions thereof which are employed may be made without departing from the spirit of the invention as embraced within the scope of the appended claims.

Having thus described the invention, what I claim is:

1. The method of making a metal-polishing composition, which consists essentially of heating from about 15 to 35 parts, by weight, of a mixture of tri-glycerides belonging to the group consisting of palmitin, stearin, olein and myristin containing from about 3% to 10%, by weight of such mixture, of free fatty acids, with about 65 to 85 parts, by weight, of finely powdered Vienna lime to a temperature above the melting point of the tri-glycerides while thoroughly agitating the mass, then delivering the mixture into molds and immediately chilling the same therein sufficiently to solidify the tri-glyceride content thereof, removing the resultant cast product from the molds and exposing the same to a moist atmosphere until a moisture-impervious skin-coat of an insoluble soap of a thickness of but a small fraction of an inch but not less than about 1/64 of an inch has formed in situ on such cast product.

2. The method of making a metal-polishing composition, which consists essentially of heating from about 15 to 35 parts, by weight, of a mixture of tallow glycerides, containing from about 3% to 10%, by weight of the mixture, of free fatty acids, with about 65 to 85 parts, by weight, of Vienna lime, in the form of a fine powder, to a temperature above the melting point of glycerides while thoroughly agitating the mass, then delivering the mixture into molds and therein immediately chilling the same sufficiently to solidify the tallow content thereof, removing the resultant cast product from the molds and exposing the same to a moist atmosphere until a moisture-impervious skin-coat of an insoluble calcium soap of a thickness of but a small fraction of an inch but not less than about one thirty-second of an inch has formed in situ on the resultant product and then hermetically sealing the product so obtained in a container.

3. A buffing composition for polishing metals, consisting essentially of a cast solid composed of an intimate mixture of about 15 to 35 parts, by weight, of tallow tri-glycerides, containing about 3% to 10% of free fatty acids, and about 65 to 85 parts, by weight of the cast solid, of finely divided Vienna lime, the cast solid being encased in a moisture-impervious protective skin-coat consisting of a calcium soap integrally formed in situ thereon and of a thickness of but a small fraction of an inch but not less than about 1/64th of an inch.

4. A buffing composition for polishing metals, consisting essentially of a cast solid composed principally of about 65 to 85 parts, by weight of Vienna lime and about 15 to 35 parts, by weight of tri-glycerides belonging to the group consisting of palmitin, stearin, olein and myristin, about 3% to 10% of which tri-glycerides consist of free fatty acids, said solid being encased in a moisture-impervious skin-coat of a thickness of but a small fraction of an inch, but not less than about 1/64 of an inch, which is composed of a calcium soap that is integrally formed thereon.

5. A buffing composition, as claimed in claim 4, wherein the skin-coat is at least about one thirty-second of an inch thick.

HUGH A. STIER.

References Cited in the file of this patent

UNITED STATES PATENTS

| Number | Name | Date |
|---|---|---|
| 609,326 | Bogani | Aug. 16, 1898 |
| 1,743,865 | Pilgrim | Jan. 14, 1930 |
| 2,119,159 | Glenning | May 31, 1938 |